(12) United States Patent
Ibrahim et al.

(10) Patent No.: US 12,466,728 B1
(45) Date of Patent: Nov. 11, 2025

(54) METHOD FOR PRODUCING HYDROGEN USING COPPER OXIDE-MAGNESIUM ALUMINATE (CuO.MgAl$_2$O$_4$) SPINEL NANOCOMPOSITE

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Babiker yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/957,808

(22) Filed: Nov. 24, 2024

(51) Int. Cl.
*C01B 3/04* (2006.01)
*B01J 23/72* (2006.01)
*B01J 37/08* (2006.01)

(52) U.S. Cl.
CPC ............... *C01B 3/04* (2013.01); *B01J 23/72* (2013.01); *B01J 37/08* (2013.01); *B01J 2523/17* (2013.01); *B01J 2523/22* (2013.01); *B01J 2523/31* (2013.01)

(58) Field of Classification Search
CPC .............. C01B 3/04; B01J 23/72; B01J 37/08
See application file for complete search history.

(56) References Cited

U.S. PATENT DOCUMENTS

| 3,899,577 A | 8/1975 | Sugier |
| 2007/0151153 A1 | 7/2007 | Xu et al. |

OTHER PUBLICATIONS

Erat et al., International Journal of Hydrogen Energy, (2022), v.47, 24255-24267.*
Drozd et al., International Journal of Hydrogen Energy, (2007), v.32, 3370-3375.*
Komal N. Patil, et al., "Sustainable Hydrogen Generation by Catalytic Hydrolysis of NaBH4 Using Tailored Nanostructured Urchin-like CuCo2O4 Spinel Catalyst", Catalysis Letters. vol. 150. Nov. 6, 2019, pp. 586-604.

* cited by examiner

*Primary Examiner* — Yong L Chu
(74) *Attorney, Agent, or Firm* — Oblon, McClelland, Maier & Neustadt, L.L.P.

(57) ABSTRACT

A method of producing hydrogen gas includes hydrolyzing sodium borohydride (NaBH$_4$) at a temperature of from about 20 to about 75 degrees Celsius (° C.) in the presence of a nanocomposite having the general formula CuO·MgAl$_2$O$_4$; and, capturing hydrogen gas evolved as a hydrolysis product. Copper oxide (CuO) represents from about 1 to about 30 weight percent (wt. %) of the total weight of the nanocomposite.

13 Claims, 4 Drawing Sheets

METHOD FOR PRODUCING HYDROGEN USING COPPER OXIDE-MAGNESIUM ALUMINATE (CuO.MgAl$_2$O$_4$) SPINEL NANOCOMPOSITE

STATEMENT OF ACKNOWLEDGEMENT

Support provided by the Imam Mohammad Ibn Saud Islamic University (IMISIU) is gratefully acknowledged.

BACKGROUND

Technical Field

The present disclosure is directed to a method of producing hydrogen, more particularly, a method of producing hydrogen gas using a copper oxide-magnesium aluminate spinel nanocomposite (CuO·MgAl$_2$O$_4$).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The tremendous industrialization and population increase in recent years have led to a search for alternate energy sources to meet the expanding energy demand. Primarily, the depletion of non-renewable energy resources and environmental concerns are compelling societies to switch to clean, renewable energy sources. On account of its high energy density (120 megajoules per kilograms (MJ/kg)), non-toxicity, and ecological friendliness, hydrogen gas has emerged as an important energy carriers among renewable sources.

While solar energy generation is inexpensive, the storage of this energy incurs costs due to a reliance on batteries, which require frequent replacement and pose challenges in their safe disposal. Conversely, hydrogen energy provides numerous advantages over batteries in terms of energy conservation and powering diverse applications. A key benefit is that hydrogen possesses a higher energy density than conventional batteries, allowing it to store greater energy in a less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride (NaBH$_4$) has become an important compound for hydrogen storage given its stability, non-flammability and non-toxicity: NaBH$_4$ further contains two moles of hydrogen (H$_2$) and that hydrogen constitutes 10.8 wt. % of the compound.

When required, hydrogen is released from NaBH$_4$ by hydrolysis:

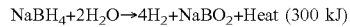

$$NaBH_4 + 2H_2O \rightarrow 4H_2 + NaBO_2 + Heat\ (300\ kJ)$$

According to this reaction, the hydrolysis releases the 2 moles of hydrogen bound within the NaBH$_4$, as well as hydrogen bound within the reactant water.

NaBH$_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate (NaBO$_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: Huff C, Long J M, Heyman A, Abdel-Fattah T M (2018) *ACS Appl Energy Mater* 1:4635-4640; Brack P, Dann S E, Wijayantha K G U (2015) *Energy Sci Eng* 3:174-188; Wei L, Ma M, Wang D, Wang Q, Lu Y, Zhang S (2018) Funct. Mater Lett. 11:1850079.] However, such noble metals are associated with high costs, low abundance and toxicity [See Bullock R M (2017) *Chemistry* 2:444-446].

Accordingly, one objective of the present disclosure is to provide spinel oxide composite materials for hydrogen production via hydrolysis of sodium borohydride (NaBH$_4$). This method circumvents the aforementioned drawbacks and helps to achieve enhanced activity and efficiency in hydrogen generation.

SUMMARY

In an exemplary embodiment, a method of producing hydrogen gas is described. The method includes hydrolyzing sodium borohydride (NaBH$_4$) at a temperature of from about 20 to about 75 degrees Celsius (° C.) in the presence of a nanocomposite having a general formula CuO·MgAl$_2$O$_4$ and then capturing hydrogen gas evolved as a hydrolysis product. Copper oxide (CuO) is present in an amount of from about 1 to about 30 weight percent (wt. %) of the total weight of the nanocomposite.

In some embodiments of the method, the ratio by weight of NaBH$_4$ to the nanocomposite is from about 1:1 to about 5:1.

In some embodiments, the ratio by weight of NaBH$_4$ to the nanocomposite is from about 1:1 to about 3:1.

In some embodiments, NaBH$_4$ is hydrolyzed at a temperature of from about 30 to about 75° C.

In some embodiments, NaBH$_4$ is hydrolyzed at a temperature of from about 35 to about 60° C.

In some embodiments, the nanocomposite has a median volume particle size (Dv50) of from about 20 to about 40 nanometers (nm), as determined by scanning electron microscope (SEM) analysis.

In some embodiments, the nanocomposite has a median volume particle size (Dv50) of from about 25 to about 35 nm, as determined by scanning electron microscope (SEM) analysis.

In some embodiments, CuO is present in an amount of from about 2 to about 25 wt. % of the total weight of the nanocomposite.

In some embodiments, CuO is present in an amount of from about 5 to about 25 wt. % of the total weight of the nanocomposite.

In some embodiments, CuO is present in an amount of from about 15 to about 25 wt. % of the total weight of the nanocomposite.

In an exemplary embodiment, a method of synthesizing a nanocomposite having the general formula CuO·MgAl$_2$O$_4$ is described, wherein CuO includes from about 1 to about 30 wt. % of the total weight of the nanocomposite.

The method includes heating a reaction mixture including distilled water, a water-soluble copper (II) salt, a water-soluble aluminum salt, a water-soluble magnesium salt and a non-reducing sugar to a temperature of from about 50 to about 100° C. to form a solution, in a first heating stage. Then, in a second heating stage, the method includes heating the solution to a temperature of from about 150 to about 200° C. for a duration sufficient to carbonize the non-reducing sugar. Subsequently, the method includes comminuting the carbonized product of the second heating stage. Finally, the method includes calcining the comminuted product at a temperature of from about 500 to about 1200° C. for a duration of from about 1 to about 5 hours.

In some embodiments: i) the copper (II) salt is selected from the group consisting of copper sulfate (CuSO$_4$), copper nitrate (Cu(NO$_3$)$_2$), copper chloride (CuCl$_2$) and copper acetate (Cu(CH$_3$COO)$_2$); ii) the aluminium salt is selected from the group consisting of aluminium sulfate (Al$_2$(SO$_4$)$_3$, aluminium nitrate (Al(NO$_3$)$_3$), aluminium chloride (AlCl$_3$) and aluminium acetate Al(CH$_3$COO)$_3$); iii) the magnesium salt is selected from the group consisting of magnesium sulfate (MgSO$_4$), magnesium nitrate (Mg(NO$_3$)$_2$), magnesium chloride (MgCl$_2$) and magnesium acetate (Mg(CH$_3$COO)$_2$); or, iv) any combination of i) to iii).

In some embodiments, the copper (II) salt is copper (II) nitrate (Cu(NO$_3$)$_2$), the aluminum salt is aluminum nitrate (Al(NO$_3$)$_3$), and the magnesium salt is magnesium acetate (Mg(CH$_3$COO)$_2$).

In some embodiments, the first heating stage includes adding distilled water and copper (II) nitrate (Cu(NO$_3$)$_2$) to a powdered mixture of non-reducing sugar, hydrated aluminium nitrate (Al(NO$_3$)$_3$) and hydrated magnesium acetate (Mg(CH$_3$COO)$_2$) to form the reaction mixture.

In some embodiments, the reaction mixture comprises from about 10 to about 25 wt. % of non-reducing sugar, based on the solids content of the reaction mixture.

In some embodiments, the non-reducing sugar comprises at least one compound selected from the group consisting of sucrose, lactose, raffinose, stachyose, trehalose, sorbose, sucralose, melezitose, raffinose and mixtures thereof.

In some embodiments, non-reducing sugar comprises sucrose.

In some embodiments, the comminuted product is calcined at a temperature of from about 600 to about 800° C. for a duration of from about 2 to about 4 hours.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
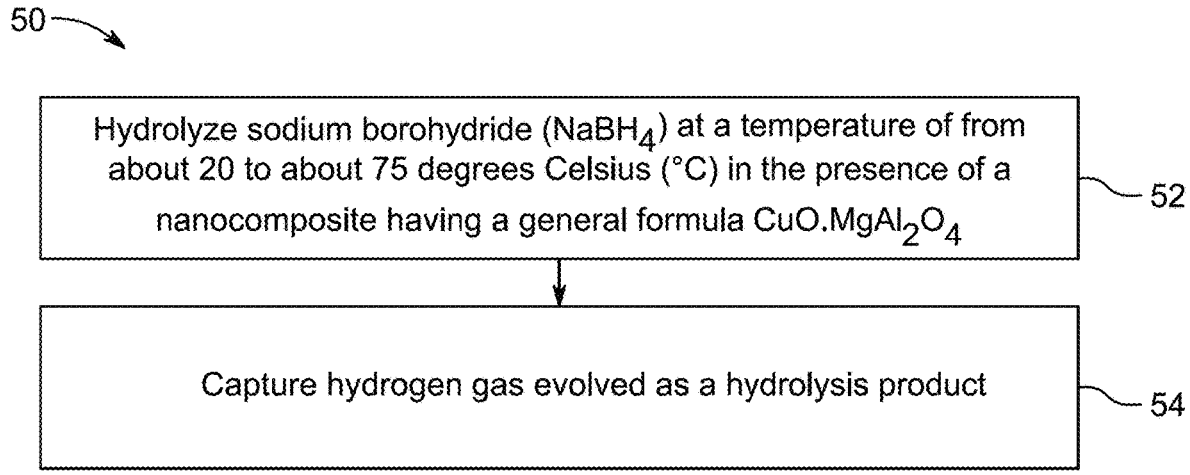
FIG. 1A is a method flowchart for producing hydrogen gas, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

As used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'compound' refers to a chemical entity, regardless of its phase-solid, liquid, or gaseous-as well as its state-crude mixture, purified, or isolated.

As used herein, the term 'particle' refers to a small object that acts as a whole unit with regard to its transport and properties.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Particle size is determined herein by Scanning Electron Microscopy (SEM).

As used herein, 'nanoparticles'—sometimes contracted herein to NPs—refers to particles having a particle size of 1 nanometer (nm) to 1000 nm. The nanoparticles of $CuO \cdot MgAl_2O_4$ may possess various morphological forms. It is envisaged, for example, that nanoparticles of $CuO \cdot MgAl_2O_4$ that are fibrous, acicular, spherical, ellipsoidal, cylindrical, bead-like, cubic or platelet-like may be present alone or in combination. Moreover, it is envisaged that agglomerates of nanoparticles having the same or different morphologies may be present in the nanocomposite.

The term 'grain' is used herein in accordance with its standard crystallographic definition as a single, individual crystal within a polycrystalline material, wherein all atoms are arranged in a consistent crystal structure. Within a polycrystalline material, the interface between two neighboring grains is referenced as the 'grain boundary'.

As used herein, the term 'room temperature' refers to a temperature range of '25 degrees Celsius (° C.)±3° C.

The term 'carbonization' as used herein refers to a thermally actuated process which transforms a carbon containing substrate to a product having an increased proportion of elemental carbon. In the present disclosure, the atmosphere of carbonization may either comprise oxygen or be oxygen free. The former alternative includes atmospheres in which the supply of oxygen is restricted. The latter alternative includes the performance of carbonization under vacuum or under an inert atmosphere, of which nitrogen and argon atmospheres may be mentioned as examples.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

As used herein, 'comminuting' refers to process of reducing the average size of solid materials into smaller particles, by crushing, grinding, cutting, vibrating, or other processes.

Hydrolysis, as used herein, is the chemical reaction of a molecule with water to produce two or more smaller molecules.

As used herein, 'hydrogen generation rate' (HGR) refers to the amount of hydrogen gas produced per unit of time during a chemical reaction.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material. In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to a method of producing hydrogen gas via hydrolysis of sodium borohydride ($NaBH_4$) using a copper oxide-magnesium aluminate spinel nanocomposite ($CuO \cdot MgAl_2O_4$). High hydrogen generation rate (HGR) values were observed for $NaBH_4$ in the presence of the nanocomposite. The nanocomposite functions to catalyze hydrolysis of $NaBH_4$ and provides faster hydrolysis than self-hydrolysis of $NaBH_4$.

FIG. 1A illustrates a flow chart of a method 50 of producing hydrogen gas. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes hydrolyzing $NaBH_4$ in the presence of a nanocomposite having the general formula $CuO \cdot MgAl_2O_4$ and at a temperature of from about 20 to about 75° C., for example from about 20 to about 70° C., from about 30 to about 65° C., from about 35 to about 60° C., from about 40 to about 55° C., or from 45 to about 50° C. Hydrolyzing $NaBH_4$ involves reacting it with water to produce sodium hydroxide, boric acid, and hydrogen gas. In this reaction, $NaBH_4$ acts a reducing agent which reduces water to produce hydrogen gas. To initiate the hydrolysis reaction, $NaBH_4$ may be mixed with water in the presence of the stated nanocomposite, optionally under manual or mechanical stirring. $NaBH_4$ is a safe, stable, and low-weight hydrogen storage material that has a high hydrogen storage capacity of 10.8 wt. %. Other examples of reducing agents which may be used in alternate embodiments include lithium aluminum hydride, calcium hydride, magnesium hydride, and zinc hydride.

In some embodiments, $NaBH_4$ is hydrolyzed at a temperature of from about 30 to about 75° C., for example from about 35 to about 70° C., from about 40 to about 65° C., from about 45 to about 60° C., or from about 50 to about 55° C. In some embodiments, $NaBH_4$ is hydrolyzed at a temperature of from about 35 to about 60° C., for example from about 36 to about 59° C., from about 37 to about 58° C., from about 38 to about 57° C., from about 39 to about 56° C., from about 40 to about 55° C., from about 41 to about 54° C., from about 42 to about 53° C., from about 43 to about 52° C., from about 44 to about 51° C., or from about 45 to about 50° C.

In some embodiments, a ratio by weight of $NaBH_4$ to the nanocomposite is from about 1:1 to about 5:1, preferably about 2:1 to about 4:1, and more preferably about 3:1. In some embodiments, the ratio by weight of $NaBH_4$ to the nanocomposite is from about 1:1 to about 3:1, for example from about 1.5:1 to about 2.5:1, or about 2:1.

At step 54, the method 50 includes capturing hydrogen gas evolved as a hydrolysis product. This is often accomplished via gas collection equipment, such as inverted jars or specialized balloons, which allow the gas to gather securely. As the hydrogen forms, it is directed into these containers to keep it from escaping. Safety precautions are crucial since hydrogen is highly flammable. Once captured, hydrogen may be refined and stored for use in a variety of applications, including fuel cells and energy generation, making it an important resource for sustainable energy solutions.

Preferably, the $NaBH_4$, in solid form, is mixed with the nanocomposite in solid form to provide a solid composition that is stable and storable at room temperature: there may be no decomposition to form hydrogen when the solid mixture of the $NaBH_4$ and the nanocomposite is stored under anhydrous conditions. The stable composition is later used as a source of hydrogen via the addition of water thereto. In alternate embodiments, the $NaBH_4$, in solid form and the nano composite are mixed immediately prior to contact with water.

It is preferred that the particle size of the nanocomposite is substantially less than the particle size of the $NaBH_4$. The $NaBH_4$ may, for example, have a median volume particle size (Dv50) that is at least 5 or even at least 10 times the median particle size of the nanocomposite. Differences in the particle size between the two solids provide a means by which the rate of formation of hydrogen gas is buffered. For example, the rate of hydrogen gas formation achieved by adding liquid water to a mixture of particles of $NaBH_4$ and particles of the nano composite having essentially the same particle size may be from 2 to 6 times the rate of hydrogen formation provided by adding water to a mixture of particles of the $NaBH_4$ and the nano composite in which the $NaBH_4$ particles have an average particle size that is at least five times, preferably at least 10 times the particle size of the nanocomposite.

The $CuO \cdot MgAl_2O_4$ nanocomposite has a spinel oxide crystal structure. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal". Conversely, when tetrahedral sites are occupied by half of the $B^{3+}$ and octahedral sites by the other half along with $A^{2+}$, the spinel phase is termed "inverse".

The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter ($g/cm^3$)), high thermal shock resistance, hydrophobicity, and low surface acidity. Doping of the oxide with copper (Cu) or copper oxide can manipulate these features due to the vacant 56 tetrahedral and 16 octahedral sites, as well as the order-disorder transitions of cations at these sites in an otherwise typical spinel structure, as indicated by the formula $(Mg)^{tet}(Al)_2^{oct}O_4$.

In some embodiments, the nanocomposite comprises copper oxide (CuO) in an amount of from about 2 to about 28 wt. %, for example from about 3 to about 27 wt. %, from about 4 to about 26 wt. %, from about 5 to about 25 wt. %, from about 6 to about 24 wt. %, from about 7 to about 23 wt. %, from about 8 to about 22 wt. %, from about 9 to about 21 wt. %, from about 10 to about 20 wt. %, from about 11 to about 19 wt. %, from about 12 to about 18 wt. %, from about 13 to about 17 wt. %, or from about 14 to about 16 wt. % of the total weight of the nanocomposite. In some embodiments, the nanocomposite comprises CuO in an amount of from about 2 to about 25 wt. %, for example from about 3 to about 24 wt. %, from about 4 to about 23 wt. %, from about 5 to about 22 wt. %, from about 6 to about 21 wt. %, from about 7 to about 20 wt. %, from about 8 to about 19 wt. %, from about 9 to about 18 wt. %, from about 10 to about 17 wt. %, from about 11 to about 16 wt. %, from about 12 to about 15 wt. %, or from about 13 to about 14 wt. %. In some embodiments, the nanocomposite comprises CuO in an amount of from about 5 to about 25 wt. %, for example from 6 to about 24 wt. %, from about 7 to about 23 wt. %, from about 8 to about 22 wt. %, from about 9 to about 21 wt. %, from about 10 to about 20 wt. %, from about 11 to about 19 wt. %, from about 12 to about 18 wt. %, from about 13 to about 17 wt. %, or from about 14 to about 16 wt. % of the total weight of the nanocomposite. In some embodiments, the nanocomposite comprises CuO in an amount of from about 15 to about 25 wt. %, for example from 16 to about 24 wt. %, from about 17 to about 23 wt. %, from about 18 to about 22 wt. %, or from about 19 to about 21 wt. %.

In some embodiments, the nanocomposite has a median volume particle size (Dv50), as determined by scanning electron microscope (SEM) analysis, of from about 20 to about 40 nm, for example from about 21 to about 39 nm, from about 22 to about 38 nm, from about 23 to about 37 nm, from about 24 to about 36 nm, from about 25 to about 35 nm, from about 26 to about 34 nm, from about 27 to about 33 nm, from about 28 to about 32 nm, or from about 29 to about 31 nm. In some embodiments, the nanocomposite has a median volume particle size (Dv50), as determined by SEM analysis, of from about 25 to about 35 nm, for example from about 26 to about 34 nm, from about 27 to about 33 nm, from about 28 to about 32 nm, or from about 29 to about 31 nm.

Figure 1B:
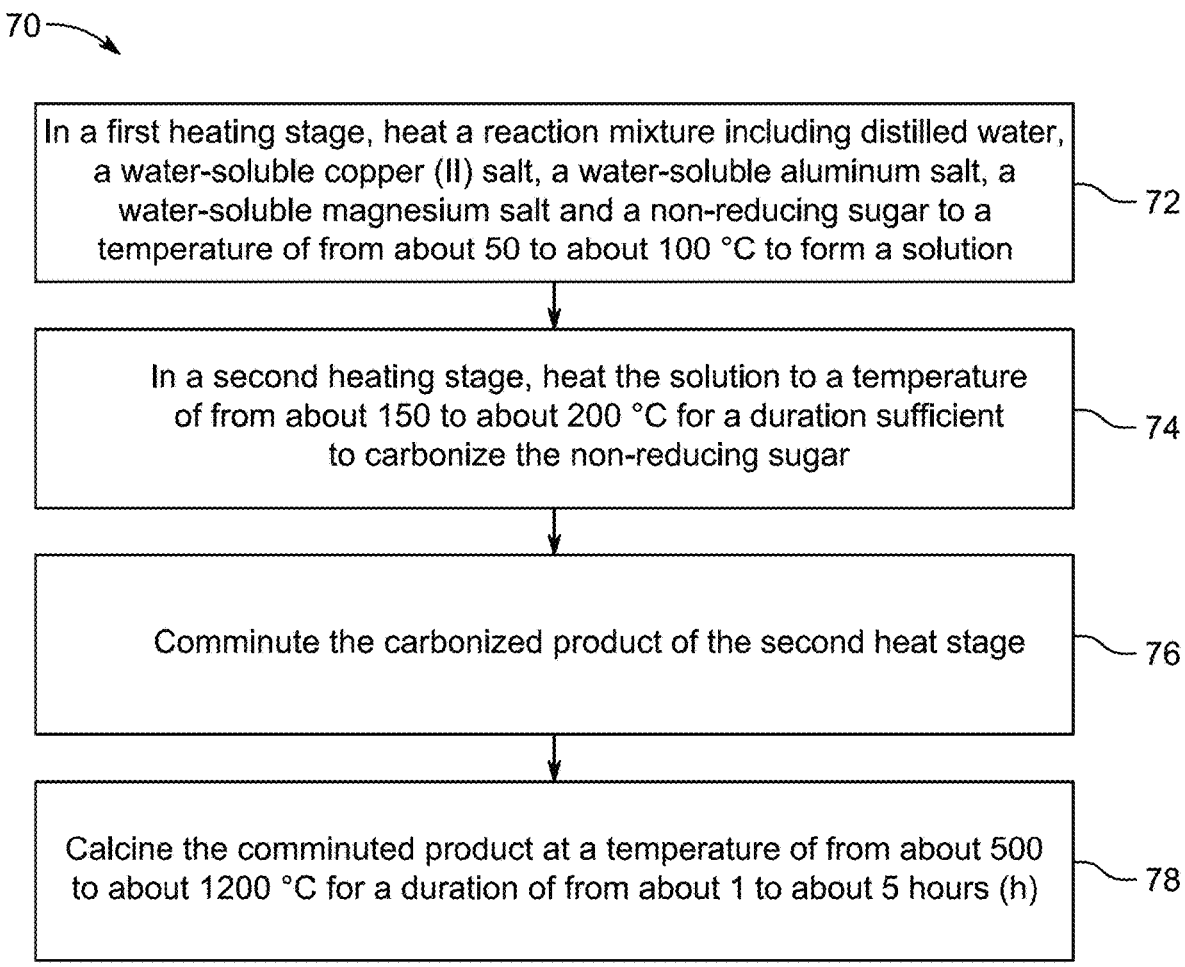
FIG. 1B is a method flowchart for synthesizing a copper oxide-magnesium aluminate spinel nanocomposite (CuO·MgAl$_2$O$_4$), according to certain embodiments.

FIG. 1B appended hereto illustrates a flow chart of an exemplary method 70 of synthesizing the $CuO \cdot MgAl_2O_4$ nanocomposite. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes heating a reaction mixture including distilled water, a water-soluble copper (II)

salt, a water-soluble aluminum salt, a water-soluble magnesium salt and a non-reducing sugar to a temperature of from about 50-100° C., for example from about 60 to about 100° C. or from about 70 to about 100° C. For example, the reaction mixture may be heated to a temperature of from about 80 to about 100° C. or from about 90 to about 100° C. to form the solution in this first heating stage. In a preferred embodiment, the solution is heated at a temperature of 100° C. in the first heating stage. The reaction mixture may be heated using heating appliances such as hot plates, heating mantles, hot air ovens, microwaves, autoclaves, tapes, oil baths, salt baths, sand baths, air baths, hot-tube furnaces, and hot-air guns.

In some embodiments: i) the copper (II) salt is selected from the group consisting of copper sulfate ($CuSO_4$), copper nitrate ($Cu(NO_3)_2$), copper chloride ($CuCl_2$) and copper acetate ($Cu(CH_3COO)_2$); ii) the aluminium salt is selected from a group consisting of aluminium sulfate ($Al_2(SO_4)_3$, aluminium nitrate ($Al(NO_3)_3$), aluminium chloride ($AlCl_3$) and aluminium acetate $Al(CH_3COO)_3$), iii) the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$); or, iv) any combination of i) to iii). In a preferred embodiment, the copper (II) salt is $Cu(NO_3)_2$, the aluminum salt is $Al(NO_3)_3$, and the magnesium salt is $Mg(CH_3COO)_2$.

In alternate embodiments, the copper salt may be selected from the group consisting of copper benzoate, tetra-ammine copper citrate, copper oxide, copper bromide, copper oxalate, copper bromide, copper chloride, copper carbonate, copper oxide, copper fluoride and copper iodide or its hydrate, and mixtures thereof. In alternate embodiments, aluminium salt may be selected from the group consisting of aluminium sulfate, aluminium phosphate, aluminium hydroxide, aluminium citrate or its hydrate, and mixtures thereof. In alternate embodiments, magnesium salt may be selected from the group consisting of magnesium citrate, magnesium bromide, magnesium hydroxide, magnesium carbonate, or magnesium lactate or its hydrate, and mixtures thereof. In alternate embodiments, the water may be tap water, bi-distilled water, deionized water, deionized distilled water, reverse osmosis water, and/or some other water.

A non-reducing sugar is a carbohydrate that doesn't get oxidized by a weak oxidizing agent in a basic aqueous solution. Non-reducing sugars do not have a hydroxyl (—OH) group attached to the anomeric carbon so they cannot reduce other compounds. All monosaccharides such as glucose are reducing sugars. A disaccharide can be a reducing sugar or a non-reducing sugar. In some embodiments, the non-reducing sugar comprises at least one compound selected from the group consisting of sucrose, lactose, raffinose, stachyose, trehalose, sorbose, sucralose, melezitose, raffinose and mixtures thereof. In a preferred embodiment, the non-reducing sugar comprises sucrose. In some embodiments, the reaction mixture comprises, based on the solids content of the reaction mixture, from about 10 to about 25 wt. % of non-reducing sugar. In exemplary embodiments, the reaction mixture comprises from about 11 to about 24 wt. %, from about 12 to about 23 wt. %, from about 13 to about 22 wt. %, from about 14 to about 21 wt. %, from about 15 to about 20 wt. %, from about 16 to about 19 wt. %, or from about 17 to about 18 wt. %, of non-reducing sugar based on the solids content of the reaction mixture.

At step 74, the method 70 includes heating the solution to a temperature of from about 150-200° C. for a duration sufficient to carbonize the non-reducing sugar in a second heating stage. For example, the solution may be heated to a temperature of from about 155 to about 195° C., from about 160 to about 190° C., from about 165 to about 185° C., or from about 170 to about 180° C., for a duration sufficient to carbonize the non-reducing sugar in this second heating stage. The controlled temperature guarantees that the sugar is thermally decomposed, resulting in the formation of carbonaceous compounds and gases. In a preferred embodiment, the solution is heated at a temperature of 180° C. in the second heating stage.

At step 76, the method 70 includes comminuting the carbonized product of the second heating stage. Comminuting may be done by grinding, crushing, cutting, vibrating, or other processes. In a preferred embodiment, the carbonized product is comminuted via grinding using a motorized particles grinder. Grinding may provide efficient and consistent particle size reduction and enhance the surface area of the nanocomposite particles.

At step 78, the method 70 includes calcining the comminuted product. The calcination is typically carried out by heating it to a high temperature, under a restricted supply of ambient oxygen. This is performed to remove impurities or volatile substances and to induce thermal decomposition. Typically, the calcination is carried out in a furnace which is preferably equipped with a temperature control system and which may provide a controlled heating rate of up to about 50 degrees Celsius per minute (° C./min), for instance up to about 40° C./min, up to about 30° C./min, up to about 20° C./min, up to about 10° C./min, up to about 5° C./min, up to about 2° C./min, or up to about 1° C./min.

The comminuted product is calcined at a temperature of from about 500 to about 1200° C. for a duration of from about 1 to about 5 hours. In certain embodiments, the comminuted product is calcined at a temperature of from about 600 to about 1100° C., preferably from about 700 to about 1000° C., and more preferably from about 800 to about 900° C. Independently of, or additional to the selected calcination temperature, the comminuted product may preferably be calcined for a duration of from about 2 to about 4 hours, for example about 3 hours. In some embodiments, the comminuted product is calcined: at a temperature of from about 600 to about 800° C., preferably from about 650 to about 750° C., more preferably from about 680 to about 720° C.; for a duration of from about 2 to about 4 hours, preferably from about 2.5 to about 3.5 hours, and more preferably for 3 hours. In a preferred embodiment, the comminuted product is calcined at a temperature of about 700° C. for about 3 hours.

The product of calcination may retain a carbonaceous residue obtained from the carbonization of the sucrose and the subsequent calcination of the carbonized product. As the calcination of the present disclosure will conventionally occur in the absence of activators or templating agents for the carbonized product, it is considered that the retained carbonaceous residue will comprise amorphous carbon. In certain embodiments, the nanocomposite may comprise amorphous carbon in an amount up to about 2 wt. %, based on the weight of the nanocomposite. For example, the nanocomposite may comprise amorphous carbon in an amount up to about 1 wt. % or up to about 0.5 wt. %, based on the weight of the nanocomposite.

EXAMPLES

The following examples demonstrate a method of producing hydrogen gas using a copper oxide-magnesium aluminate spinel nanocomposite ($CuO \cdot MgAl_2O_4$). The examples are provided solely for illustration and are not to be construed as limitations of the present disclosure, as many variations thereof are possible without departing from the spirit and scope of the present disclosure.

Example 1: Preparation of 2.5-20 wt. % $CuO \cdot MgAl_2O_4$ Nanocomposite

About 10.0 grams (g) of food-grade sucrose, 17.46 g of aluminum nitrate nonahydrate ($Al(NO_3)_3 \cdot 9H_2O$) and 25.41 g of hydrated magnesium acetate ($Mg(Ac)_2 \cdot 4H_2O$) were transferred to a 500 milliliters (mL) beaker. The amounts of copper nitrate ($Cu(NO_3)_2$) appropriate to produce 10 wt. % $CuO \cdot MgAl_2O_4$ were added, followed by 50 mL distilled water. The beaker content was heated to 100 degrees Celsius (° C.) till the content turned to a clear solution. The temperature was raised to about 180° C., and the beaker was heated until the sucrose had carbonized. The resultant black product was ground in a motor and calcined 700° C. for 3 hours (h). The 2.5 wt. % $CuO \cdot MgAl_2O_4$, 5 wt. % $CuO \cdot MgAl_2O_4$, and 20 wt. % $CuO \cdot MgAl_2O_4$ triple nanocomposites were fabricated similarly, save for the use of the appropriate amount of copper nitrate to produce the targeted CuO percentages.

Example 2: Hydrogen Production Via Hydrolysis of Sodium Borohydride ($NaBH_4$)

For hydrogen production, $NaBH_4$ was hydrolyzed by reaction with distilled water in the presence of the $CuO \cdot MgAl_2O_4$ nanocomposites obtained in Example 1; the hydrogen gas evolved as a hydrolysis product was captured and quantified volumetrically at 1 atmosphere (0.1 MPa) pressure. The effect of varying the weight of $NaBH_4$ provided to the catalytic hydrolysis reaction and the effect reaction temperature on the catalytic hydrolysis of $NaBH_4$ over 20 wt. % $CuO \cdot MgAl_2O_4$ were also studied. Furthermore, the effect of reaction temperature on the catalytic hydrolysis process was also examined at a temperature range of 30-45° C. using 0.5 g of 20 wt. % $CuO \cdot MgAl_2O_4$.

Results and Discussion

Figure 2A:
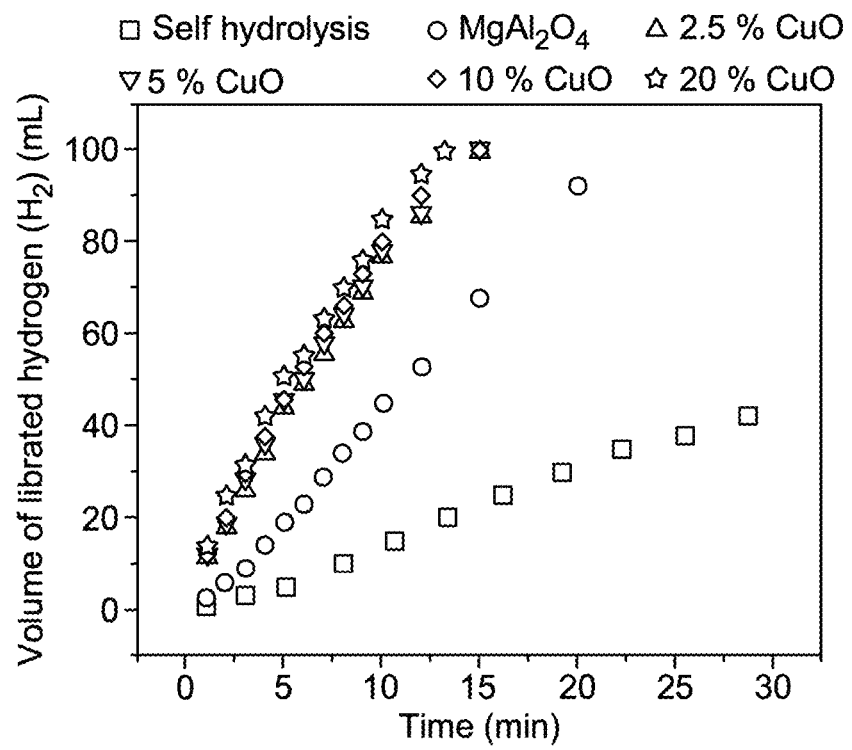
FIG. 2A shows a variation in the volume of liberated hydrogen with the reaction time of the hydrolysis performed at a reaction temperature of 30° C. in the presence of either pure MgAl$_2$O$_4$, or independently CuO·MgAl$_2$O$_4$ nanocomposites comprising CuO in varying amounts of from 2.5 to 20 wt. % based on the total weight of the nanocomposite (hereinafter 2.5-20 wt. % CuO·MgAl$_2$O$_4$) and which have been calcined at 700 degrees Celsius (° C.), according to certain embodiments.

The effect of hydrolysis of $NaBH_4$ with and without the 2.5-20 wt. % $CuO \cdot MgAl_2O_4$ nanocomposite catalyst is explored. FIG. 2A shows the variation of in the volume of liberated hydrogen with reaction time—at a reaction temperature of 30° C. —when the hydrolysis is performed independently over pure $MgAl_2O_4$, and over $CuO \cdot MgAl_2O_4$ nanocomposites comprising 2.5 wt. %, 5 wt. %, 10 wt. % and 20 wt. % CuO, based on the weight of the nanocomposite, which nanocomposites had been calcined at 700° C. The catalytic action of the pure and CuO-loaded catalysts was clearly observed where all catalysts exhibited catalytic activity higher than the self-hydrolysis process. Results also indicated that the pure $MgAl_2O_4$ catalyst shows a lower catalytic activity as compared to the CuO-loaded catalysts.

Figure 2B:
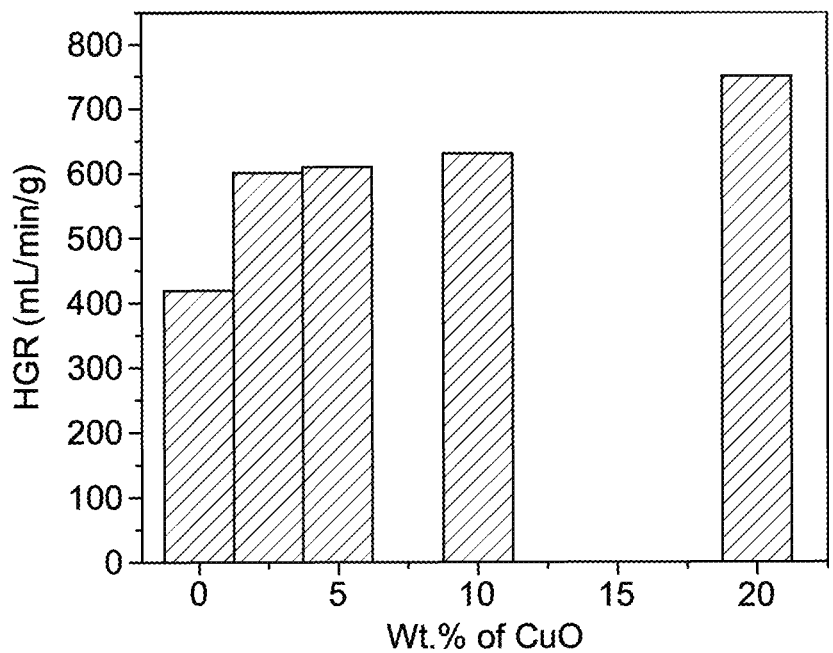
FIG. 2B shows a variation in the hydrogen generation rate (HGR) for the hydrolysis reaction performed at a temperature of 30° C. in the presence of either pure MgAl$_2$O$_4$, or independently 2.5-20 wt. % CuO·MgAl$_2$O$_4$ nanocomposites calcined at 700° C., according to certain embodiments.

FIG. 2B shows the variation of hydrogen generation rate (HGR) with wt. % CuO, when the hydrolysis is performed at a reaction temperature of 30° C. independently over pure $MgAl_2O_4$, and over $CuO \cdot MgAl_2O_4$ nanocomposites comprising 2.5 wt. %, 5 wt. %, 10 wt. % and 20 wt. % CuO, based on the weight of the nanocomposite, which nanocomposites had been calcined at 700° C. In addition, among all CuO loaded catalysts (2.5-20%), the catalyst containing 20% CuO was the most active one with a high HGR of 750 milliliters per minute per gram (mL/min/g) at room temperature (30° C.).

Figure 3A:
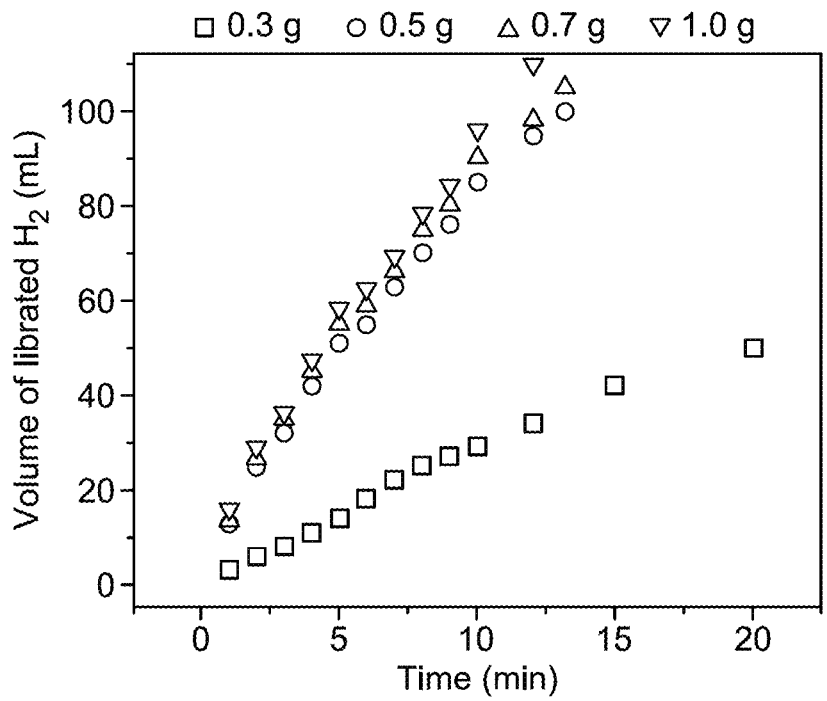
FIG. 3A shows a variation in the volume of liberated hydrogen with reaction time with weight of sodium borohydride (NaBH$_4$) over 20 wt. % CuO·MgAl$_2$O$_4$ catalyst calcined at 700° C., according to certain embodiments.
Figure 3B:
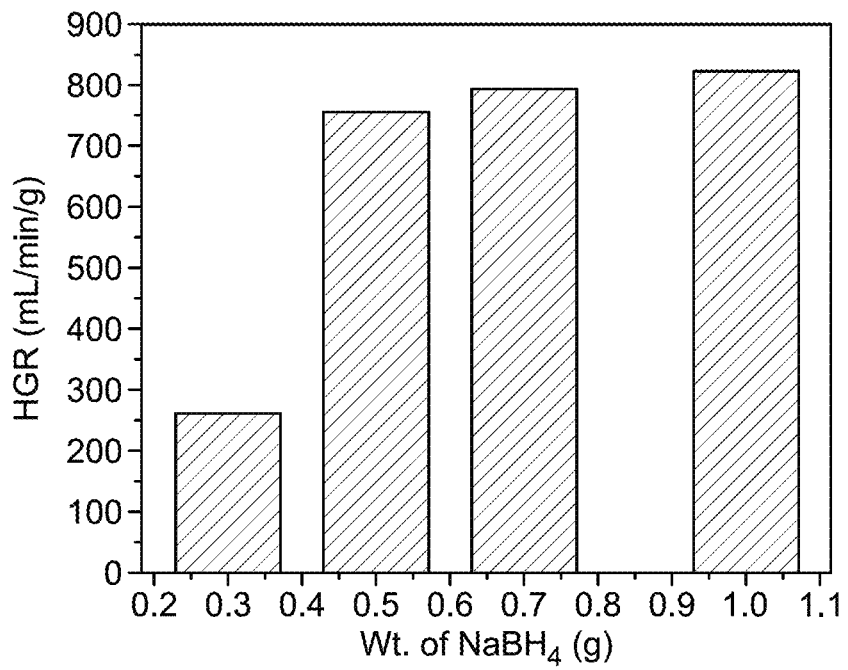
FIG. 3B shows a variation in the hydrogen generation rate (HGR) with weight of NaBH$_4$ over 20 wt. % CuO·MgAl$_2$O$_4$ catalyst calcined at 700° C., according to certain embodiments.

The impact of weight of $NaBH_4$ and reaction temperature on the catalytic hydrolysis of $NaBH_4$ over 20 wt. % $CuO \cdot MgAl_2O_4$ (0.5 g) was also studied. FIG. 3A shows the variation in the volume of liberated hydrogen with reaction time over 20 wt. % $CuO \cdot MgAl_2O_4$ composite catalyst calcined at 700° C. FIG. 3B shows a variation of HGR with weight of $NaBH_4$ over 20 wt. % $CuO \cdot MgAl_2O_4$ (0.5 g). As the weight of $NaBH_4$ increases, the rate of hydrolysis increases giving values of HGR of 260, 750, 790, and 820 mL/min/g at room temperature, respectively, corresponding to 0.3, 0.5, 0.7 and 1.0 g of $NaBH_4$.

Figure 4A:
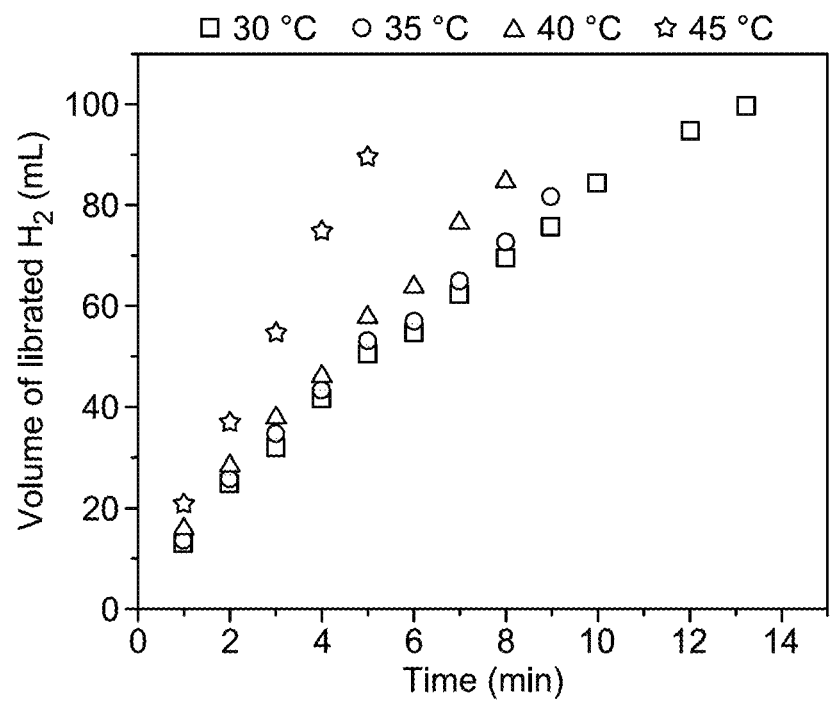
FIG. 4A shows a variation in the volume of liberated hydrogen with reaction temperature over 20 wt. % CuO·MgAl$_2$O$_4$ catalyst calcined at 700° C., according to certain embodiments.
Figure 4B:
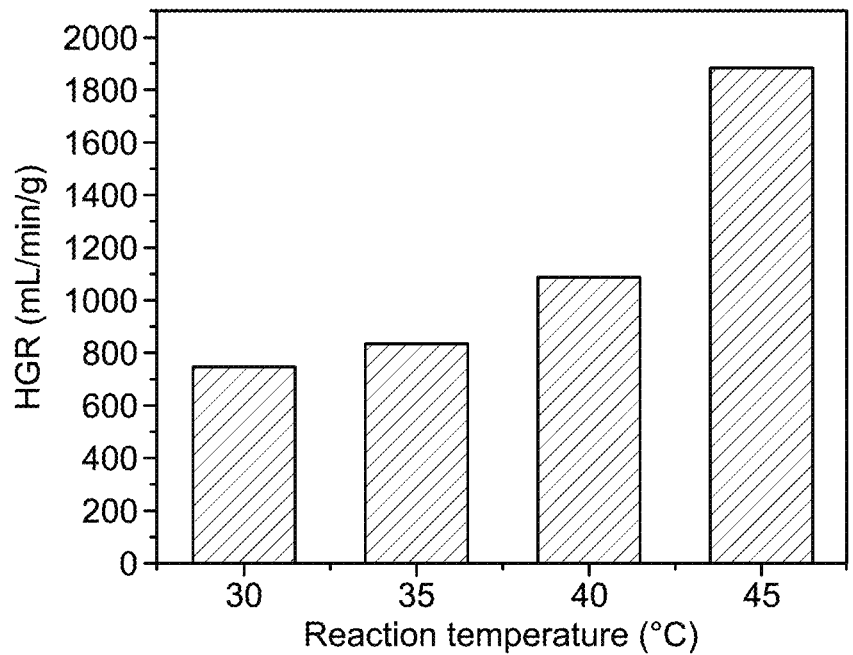
FIG. 4B shows a variation in the hydrogen generation rate (HGR) with reaction temperature over 20 wt. % CuO·MgAl$_2$O$_4$ catalyst calcined at 700° C., according to certain embodiments.

The effect of reaction temperature on the catalytic hydrolysis process was also examined at a temperature range of 30-45° C. using 0.5 g of 20 wt. % $CuO \cdot MgAl_2O_4$. FIG. 4A shows a variation of volume of liberated hydrogen with reaction temperature over 20 wt. % $CuO \cdot MgAl_2O_4$ composite catalyst calcined at 700° C. FIG. 4B shows a variation of HGR with reaction temperature over 20 wt. % $CuO \cdot MgAl_2O_4$. Values of HGR of 750, 830, 1086, and 1875 mL/min/g were obtained at reaction temperatures of 30° C., 35° C., 40° C., and 45° C., respectively. Activation energy for this reaction was calculated to be 40.8 kilojoules per mole (kJ/mol).

Numerous modifications and variations of the present disclosure are possible in light of the above teachings. It is, therefore, to be understood that within the scope of the appended claims, the invention may be practiced otherwise than as specifically described herein.

The invention claimed is:

1. A method of producing hydrogen gas comprising:
hydrolyzing sodium borohydride ($NaBH_4$) at a temperature in a range of from 30 to 50° C. in the presence of water and a nanocomposite of formula $CuO \cdot MgAl_2O_4$, thereby generating hydrogen gas at a rate of from 600 to 750 mL/min/g; and,
capturing hydrogen gas formed by the hydrolyzing,
wherein a weight ratio of the $NaBH_4$ to the nanocomposite in the hydrolyzing is in a range from 2:1 to 4:1,
wherein the nanocomposite comprises CuO in a range of from 2.5 to 20 wt. %, relative to a total nanocomposite weight,
wherein the nanocomposite has a median volume particle size (Dv50) in a range of from 25 to 35 nm, determined by scanning electron microscope analysis.

2. The method of claim 1, wherein a weight ratio of the $NaBH_4$ to the nanocomposite is in a range from 2:1 to less than 3:1.

3. The method of claim 2, wherein the weight ratio the $NaBH_4$ to the nanocomposite is in a range from 2.5:1 to 3:1.

4. The method of claim 1, wherein the $NaBH_4$ is hydrolyzed at a temperature in a range of from 35 to 50° C.

5. The method of claim 1, wherein the $NaBH_4$ is hydrolyzed at a temperature of from 45 to 50° C.

6. The method of claim 1, wherein the nanocomposite has a median volume particle size (Dv50) in a range of from 28 to 32 nm, as determined by scanning electron microscope (SEM) analysis.

7. The method according to claim 1, wherein the median volume particle size (Dv50) of the nanocomposite is in a range of from 29 to 31 nm, as determined by scanning electron microscope (SEM) analysis.

8. The method according to claim 1, wherein the nanocomposite comprises 2.5 wt. % of the CuO, relative to the total nanocomposite weight.

9. The method of claim 1, wherein the nanocomposite comprises 5 wt. % of the CuO, relative to the total nanocomposite weight.

10. The method of claim 1, wherein the nanocomposite comprises 15 wt. % of the CuO, relative to the total nanocomposite weight.

11. The method of claim 1, wherein the nanocomposite comprises 10 wt. % of the CuO, relative to the total nanocomposite weight.

12. The method of claim 1, wherein the nanocomposite comprises 20 wt. % of the CuO, relative to the total nanocomposite weight.

13. The method of claim 1, which, at 30° C. and 1 atm, produces 100 mL of $H_2$ per 0.5 g of the nanocomposite within 15 minutes.

* * * * *